Figure 1:
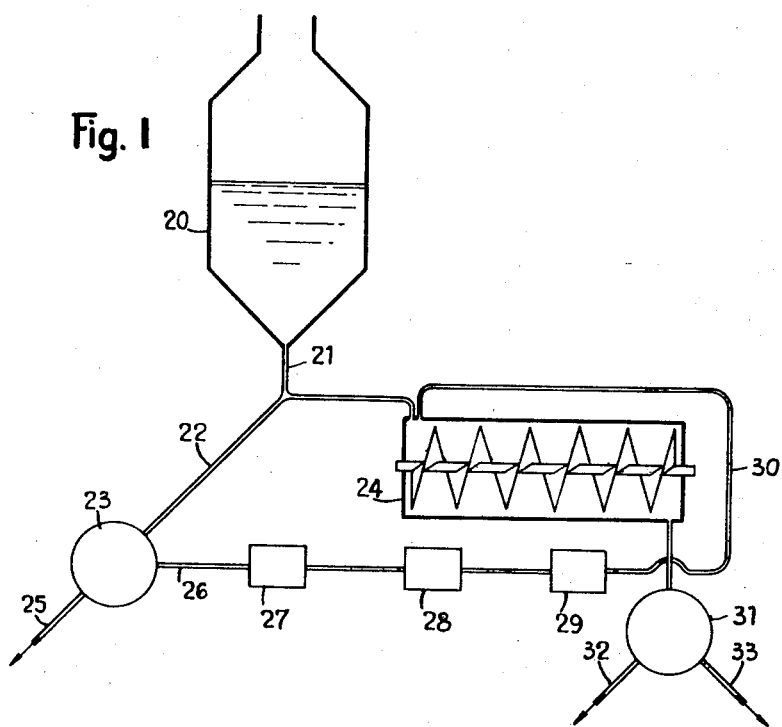

Dec. 5, 1967  A. R. GRANDADAM  3,356,532
CRYSTALLIZATION OF SUGAR
Filed Jan. 7, 1964  2 Sheets-Sheet 1

INVENTOR:
ALBERT RENE GRANDADAM
BY
E. M. Squire
ATT'Y

Dec. 5, 1967

A. R. GRANDADAM 3,356,532

CRYSTALLIZATION OF SUGAR

Filed Jan. 7, 1964

2 Sheets-Sheet 2

INVENTOR:
ALBERT RENÉ GRANDADAM
By
E. M. Squire
ATTY.

3,356,532
CRYSTALLIZATION OF SUGAR
Albert René Grandadam, Saint-Maur, France, assignor to
  Andre Pierre Osmond Bizet, Saint-Maur, France
Filed Jan. 7, 1964, Ser. No. 336,172
Claims priority, application France, Jan. 8, 1963, 921,119
12 Claims. (Cl. 127—58)

The present invention relates to a process for the crystallization of sugar in the sugar making industry and sugar refineries.

The crystallization of sugar from beet sugar or cane sugar syrups is generally obtained by evaporation and cooling. These operations are carried out in cooking or boiling apparatuses and in crystallizers or mixers.

In the course of the cooking of the syrups seed crystals are created in the latter or seed crystals are introduced in the latter and these seed crystals are enlarged during the cooking by a continuous supply of syrups from which a part of the water is removed by evaporation so as to maintain a given degree of supersaturation of the sugar within its mass during the cooking. The cooked mass or massecuite obtained, which contains sugar crystals in suspension in the syrup having a low sugar content, is then poured into crystallizers or mixers where it is cooled so as to obtain a crystallization by cooling. When the mass has reached a given temperature generally 40–60° C., it is introduced into a centrifugal separator where it is centrifuged so as to separate the crystallized sugar formed, and a residue is collected which still contains sugar in solution and is once more subjected to the same series of operations. This series of operations is called a run. Normally, a plurality of successive runs are effected, the duration of which increases each time owing to the diminishing amount of sugar in the residues, and at the end of the last run there is obtained as residue molasses which still contain a rather large amount of sugar.

The total cooking time in sugar making in respect of an operation comprising three runs is usually about between 17 and 22 hours with a high consumption of a large amount of steam which varies widely with respect to time and a utilization of a large number of cooking apparatuses.

This cooking, which lasts several hours, results in substantial losses of sugar which is destroyed with the by-products, so that the quality of the sugared juice is impaired. Further, the non-sugar itself undergoes changes which increase the viscosity. Now it is known that the fluidity of the mass is a function of the viscosity of the residue and a certain fluidity is necessary to permit the transfer of the massecuite from one apparatus to the other and the centrifuging of this massecuite. The higher the sugar crystal content of the massecuite the greater the necessity of a high water content so as to obtain this fluidity. On the other hand, the crystallization yield upon cooling in the mixer is the lower as the water content is higher. Since in order to obtain a good crystallization there must exist a certain relative mobility of the crystals and the residue when cooling to permit a good diffusion of the sucrose through the residue, it is current practice to dilute the mass in the crystallizer with saturated residue which does not crystallize and only acts as a diluting agent, or with water which lowers the speed of crystallization of the sugar and results in a dissolution of the latter in the mother liquor where it remains in solution at the end of the treatment in the mixer. Consequently, in conventional processes it is impossible to obtain in each run an overall sugar yield exceeding 70% (this yield is the ratio between the weight of the sugar collected and the weight of the sugar present in the massecuite, the yield usually being of the order of 55–65%).

It is therefore necessary, as mentioned hereinbefore, to employ a plurality of successive runs.

Apart from the aforementioned drawbacks, the cooking is a delicate operation if it is desired to obtain crystals having a regular and constant size, this being particularly so in the last run where viscosity is high owing to in particular the modification of the non-sugars, fine crystals being obtained which block the interstices between the large crystals and render the centrifuging operation difficult.

The object of the present invention is to provide a process which markedly increases the crystallization of the syrup in sugar works or sugar refineries and consequently permits a decrease in the number of runs, which may be as much as 50%, a decrease in the consumption of fuel and a more efficient utilization of the apparatuses of the plant, or a reduction in the required number of cooking apparatuses.

The invention provides a process for crystallizing sugar from syrups from the sugar-making industry or sugar refinery of the type comprising at least one series of operations including a concentrating stage and/or a cooling stage and a centrifuging stage, wherein at least a part of the mass containing sugar crystals is withdrawn at one moment of the process selected from the concentrating and cooling stages and the passages between the concentrating, cooling and centrifuging stages, the sugar crystals contained in said part are removed, and the sugar liquid from which the crystals have been removed in one of said concentrating, cooling and centrifuging stages is returned to and admixed with the rest of said mass.

Further features and advantages of the invention will be apparent from the ensuing description, with reference to the accompanying drawings to which the invention is in no way limited.

Figure 2:
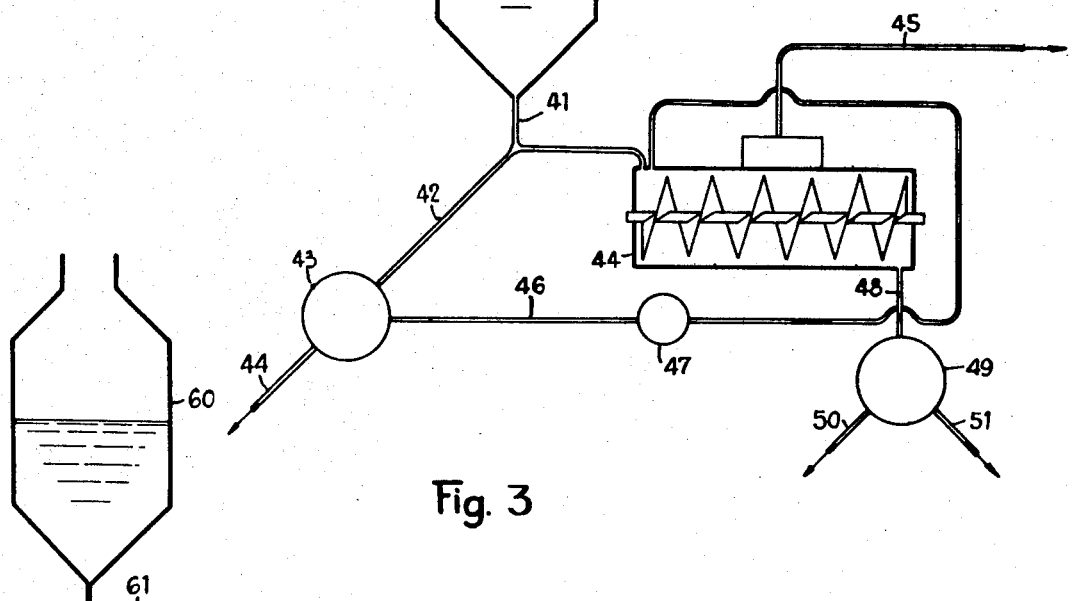
Figure 3:
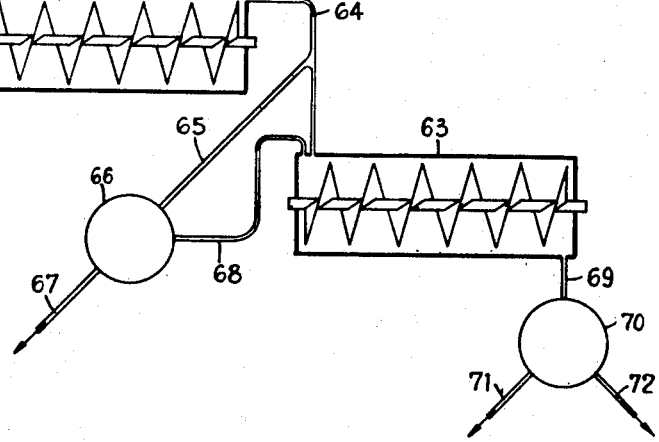

In the drawings:

FIGS. 1–3 are flow diagrams showing various manners of carrying out the process of the invention.

FIG. 1 shows diagrammatically a manner of carrying out the process of the invention. The syrup is cooked in a conventional cooking apparatus 20 in the usual manner. At the end of the cooking and after concentrating or compacting (serrage), the apparatus is drained by way of a pipe 21 and there is withdrawn by way of a pipe 22 a part of the massecuite in its path through the pipe 21 so as to send it to a centrifugal separator 23, the rest of the massecuite being sent by way of the pipe 21 to a conventional mixer 24 for its crystallization by cooling. If desired, a cooling mixer could be inserted in the pipe 22. In the centrifugal separator 23, the withdrawn massecuite is centrifuged, the sugar is collected at 25 and the mother liquor issues by way of a pipe 26 and is, if desired, subjected to diluting and refining operations at 27, de-aerating and heating operations at 28 and a concentrating operation at 29 (these operations can be eliminated if desired but they are preferred in that they tend to insure a sound operation of the process). The mother liquor is sent by way of a pipe 30 to the mixer 24 where it is admixed with the rest of the massecuite. In this way the massecuite which is cooled, contains a smaller amount of sugar crystals which are immersed in a supersaturated mother liquor which imparts good fluidity to the mass and insures a good mobility of the mother liquor around the crystals. Consequently, crystallization is effected under conditions which are better than those prevailing in the conventional process and the temperature in the mixer can be lowered (at least down to, for example, 30° C. instead of the conventional 50–60° C.) while still providing at the end of the mixing sufficient fluidity for the final centrifuging carried out in the apparatus 31 in which the sugar is collected at 32 and the residue at 33.

In the conventional process, instead of sending a concentrated mother liquor to the mixer, it would have been necessary to dilute the massecuite either with a saturated residue which only has a diluting function and therefore does not crystallize, or with water so as to obtain a fluidity suitable for the centrifuging operation with the resulting disadvantages mentioned hereinbefore.

The concentrating operation at 29 has the advantage of increasing the ratio $$\frac{\text{non-sugar}}{\text{water}}$$

of the mother liquor returning to the mixer 24 and this still further enhances the crystallization in this mixer. However, it must not be pushed to the point of once more obtaining crystals in the motor liquor.

The amount of massecuite withdrawn through 22 can advantageously vary between 25 and 60% of the massecuite; it is usually 30-40%. However, as a variant, it is also possible to withdraw the whole massecuite and centrifuge it as 23, concentrate the mother liquor and send it to the mixer 24. In this case, sugar crystals are introduced into this mixer whose crystal size can be so chosen as to obtain optimum crystallization.

Inw ithdrawing for example 50% of the massecuite by way of 22, it is possible to obtain a crystallization yield in the run of 70% whereas in conventional processes the yield is 64% in respect of the same massecuite, the residue issuing from the mixer having a purity of 80, whereas in the conventional processes its purity exceeds 82.5.

FIG. 2 shows a modification of the manner of carrying out the invention just described, the massecuite which has substantially not received an extreme concentrating or compacting leaving a cooking apparatus 40 by way of a pipe 41 and being divided by a pipe 42 into a fraction which is fed to a centrifugal separator 43 and a fraction which is fed directly to a concentrating mixer 44 operating under a vacuum, the latter being created in this mixer by way of a pipe 45. The sugar crystals are withdrawn from the separator 43 at 44 and a pipe 46 including a concentrating apparatus 47 returns the mother liquor to the concentrating mixer 44. In this embodiment, the compacting is carried out in the concentrating mixer 44 and there are obtained in the run sugar yields of about 90%, which is a considerable increase over conventional yields. A pipe 48 feeds at the end of the crystallization the massecuite from the mixer 44 to a conventional centrifugal separator 49 which separates the sugar at 50 and the residue at 51. Moreover, one or more cooling mixers could be disposed between the concentrating mixer 44 and the separator 49 so as to still further increase the crystallization yield.

The manner of carrying out the invention shown in FIG. 3 comprises withdrawing a fraction of the massecuite in the course of mixing (crystallization by cooling) and returning the mother liquor resulting from the centrifugation of this fraction to the same mixing stage.

The massecuite issues from the conventional cooking apparatus 60 after compacting and is supplied by way of a pipe 61 to an assembly of mixers constituted by two mixers in series relation, 62 and 63, which are interconnected by a pipe 64. The massecuite starts to cool in the mixer 62 and then passes while still sufficiently fluid into the mixer 63 where it finishes its cooling and crystallization. A branch pipe 65 connected to the pipe 64 withdraws a part of the massecuite and supplies it to a centrifugal separator 66 where it is centrifuged. The sugar is withdrawn at 67 and the mother liquor is sent by way of a pipe 68—if desired after having been diluted, refined, de-aerated, brought to a given pH and concentrated—to the mixer 63. The cooled massecuite leaves the mixer 63 at the end of crystallization and is supplied by way of a pipe 69 to a centrifugal separator 70 where the sugar is withdrawn at 71 and the residue at 72.

In this manner of carrying out the invention, there is withdrawn at 65 a sufficient amount of massecuite for obtaining at the end of crystallization a sugar content which is less than 45% of the weight of the massecuite and preferably 25-40% of the latter, which permits the maximum reduction in the temperature of the massecuite at the end of mixing and consequently a more complete crystallization without adversely affecting the subsequent centrifuging, since the massecuite will remain sufficiently fluid and will comprise regular crystals.

Note that as in the preceding embodiment, the whole of massecuite issuing from the mixer 62 could be centrifuged at 66. In this case, sugar crystals from the pipe 67 or from another stage are added so as to reconstitute a massecuite in the mixer 63.

In this way, it is also possible to reduce the number of runs owing to the improved crystallization yield. It will be obvious that each run is carried out in accordance with the invention.

It is also possible to withdraw a fraction of the massecuite between the mixer and the turbine placed at the end of cooling stage and to introduce the mother liquor obtained in the rest of the massecuite in a waiting mixer before the final centrifugation.

In the manners of carrying out the invention shown in FIGS. 1-3, it is possible, if desired, to introduce in the mixer in addition to the mother liquor from the centrifuging of the fraction removed from the massecuite, a residue from a previous stage of manufacture which has a lower purity and which was or was not previously diluted, refined, heated and concentrated. This is possible owing to the very favourable conditions of crystallization afforded by the process of the invention. This recycling of the mother liquor of lower purity than the residue into which it is introduced permits increasing the ratio $$\frac{\text{non-sugar}}{\text{water}}$$

of the mother liquor in course of cooling and this still more increases the crystallization. This residue of lower purity can even be molasses in the crystallization cooling stage of the last run or the next to the last run, since the residue obtained at this stage has not been subjected to as much cooking as in conventional processes and consequently does not have as high a viscosity; moreover, it contains a smaller amount of fine crystals in suspension, these molasses can also have an origin different from that obtained in the plant employing said process.

For reasons of simplicity, manners of carrying out the process of the invention in a discontinuous or intermittent manner have been described with reference to FIGS. 2-4. However, it will be understood that it is perfectly possible to operate in a continuous manner, if desired, without departing from the scope of the invention. In this case, it suffices to remove the fraction of the massecuite continuously and to continuously return the mother liquor from which the crystals have been removed to the required stage.

Owing to a judicious control of the operations, the process of the invention permits the elimination of any cooking (crystallization by evaporation in a cooking apparatus) of a juice whose purity is lower than about 82. Now, it is known that it is just these cookings which are the longest, the most delicate to carry out and the most detrimental owing to the changes they create in the sugar and in the non-sugars. Consequently, it is possible to limit all the operations to one or two runs and to reduce the total cooking time to less than about half the usual time.

These remarkable results are possible since, in the process of the invention, an artificial or non-artificial massecuite can be obtained at any point of the process which, for a given fluidity, has a mother liquor having a much higher concentration of sugar than in conventional processes. It is possible to obtain a ratio $$\frac{\text{non-sugar}}{\text{water}}$$

much higher than that usually obtained and this has for result an improved crystallization during the series of operations and consequently a possible reduction in the number of runs.

Therefore, the process of the invention results in an important saving in fuel, an improved utilization of the evaporation and cooking or boiling units, a very improved sugar yield of the latter, a reduction in manpower and higher productivity. The centrifuging, heating and concentrating operations in the process of the invention are very easily carried out in conventional apparatuses or in merely improved apparatuses of sugar works and sugar refineries and are very economical owing to the considerable saving in equipment afforded by the process of the invention.

Although specific examples of manners of carrying out the invention have been described with reference to the drawings, it must be understood that the scope of the invention is not intended to be limited thereto.

Thus, a particularly interesting manner of carrying out the invention concerns the continuous crystallization by concentrating without cooking a syrup mixed with sugar crystals followed by a cooling and then a centrifugation of the mass; this manner of carrying out the process eliminates the continuous or discontinuous cooking in a cooking apparatus where a part of the water contained in the syrup is evaporated in the presence of sugar crystals. In this case, the syrup to be refined is concentrated without creating crystallization, preferably in rapid evaporators, a given amount of sugar having a given grain size is intimately admixed with the liquid leaving the evaporator, and a part of the massecuite is thereafter withdrawn in the manner indicated hereinbefore. The series of operations mentioned hereinbefore can be effected continuously in a manner which can be fully automatic.

Having now described my invention what I claim as new and desire to secure by Letters Patent is:

1. In a process for crystallizing sugar from syrups from sugar works and sugar refineries including at least one run of treating steps consisting of concentrating said syrup in a concentrating apparatus to obtain a massecuite containing sugar crystals, cooling the massecuite in mixing means to further crystallize the massecuite, and centrifuging the cooled massecuite in a centrifugal separator to separate the sugar crystals from a residue which is substantially free from sugar crystals, the improvement consisting of further treating in said run at least a portion of said massecuite after said concentrating step and before the end of said cooling step by centrifuging said portion of massecuite in a centrifugal separator to separate the sugar crystals from a mother liquor, and introducing said motor liquor in said mixing means.

2. The improvement as claimed in claim 1, further comprising introducing a concentrated sugar-containing residue having a purity lower than that of said mother liquor into said mixing means.

3. The improvement as claimed in claim 1, further comprising concentrating said mother liquor before introducing it in said mixing means.

4. The improvement as claimed in claim 1, wherein the massecuite continuously flows from said concentrating apparatus to the mixing means and said portion of the massecuite is continuously centrifuged and said mother liquor is continuously introduced in said mixing means.

5. The improvement as claimed in claim 1, wherein the whole of said massecuite is treated after said concentrating step and before the end of said cooling step, and said mother liquor is sowed by adding sugar crystals thereto to complete the crystallization in said mixing means.

6. The improvement as claimed in claim 1, wherein said portion of the massecuite is between 25 and 75% of the total massecuite.

7. The improvement as claimed in claim 6, wherein said portion of the massecuite is betwen 30 and 50% of the total massecuite.

8. In a process for crystallizing sugar from syrups from sugar works and sugar refineries including at least one run of treating steps consisting of concentrating said syrup in a concentrating apparatus to obtain a massecuite containing sugar crystals, cooling the massecuite in mixing means to further crystallize the massecuite, and centrifuging the cooled massecuite in a centrifugal separator to separate the sugar crystals from a residual mother liquor which is substantially free from sugar crystals, the improvement consisting of withdrawing in said run a portion of said massecuite after said concentrating step and before said cooling step, centrifuging said portion of massecuite in a centrifugal separator to separate the sugar crystals from a mother liquor, and re-introducing said mother liquor into the rest of said massecuite in said mixing means.

9. The improvement as claimed in claim 8, wherein said cooling of the massecuite in said mixing means is effected at subatmospheric pressure.

10. In a process for crystallizing sugar from syrups from sugar works and sugar refineries including at least one run of treating steps consisting of concentrating said syrup in a concentrating apparatus to obtain a massecuite containing sugar crystals, cooling the massecuite in mixing means to further crystallize the massecuite, and centrifuging the cooled massecuite in a centrifugal separator to separate the sugar crystals from a residue which is substantially free from sugar crystals, the improvement consisting of withdrawing in said run a portion of said massecuite from said mixing means, centrifuging said portion of massecuite in a centrifugal separator to separate the sugar crystals from a mother liquor, and re-introducing said mother liquor into the rest of said massecuite in said mixing means.

11. The improvement as claimed in claim 10, further comprising introducing a concentrated sugar-containing residue having a purity lower than that of said mother liquor into said mixing means.

12. The improvement as claimed in claim 11, wherein said residue of lower purity is composed of molasses.

References Cited

UNITED STATES PATENTS

| 2,032,160 | 2/1936 | Widmer | 127—58 |
| 2,129,864 | 9/1938 | Newkirk | 127—62 |
| 2,478,971 | 8/1949 | Lindgren | 127—56 |

FOREIGN PATENTS

| 310,369 | 3/1929 | Great Britain. |

OTHER REFERENCES

De Coudray: A New Massecuite Process, Sugar, May 1946, pp. 36 and 37.

MICHAEL E. ROGERS, *Primary Examiner.*